Figure 1:
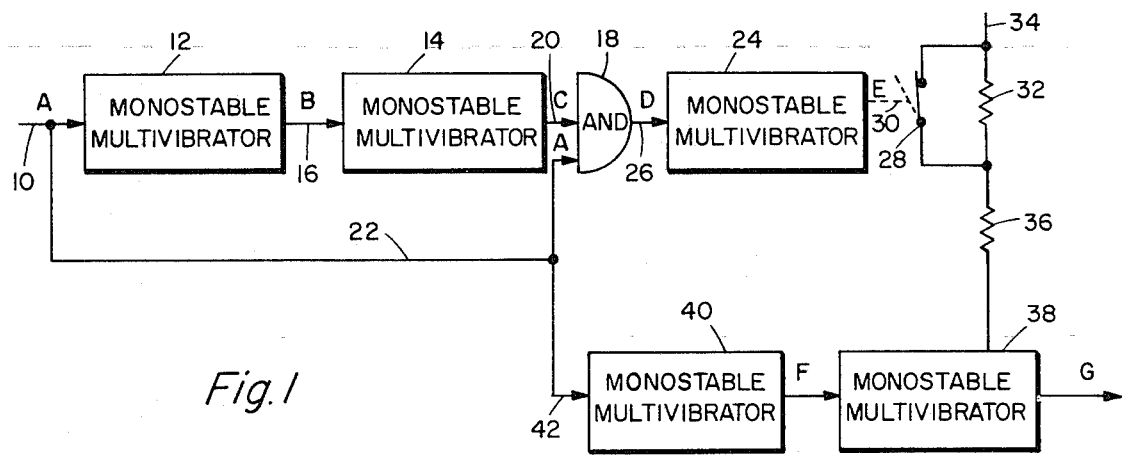

United States Patent [19]
Butler et al.

[11] 3,713,145
[45] Jan. 23, 1973

[54] PULSE WIDTH CONTROL FOR RADAR TRANSPONDERS
[75] Inventors: Thomas A. Butler; Reinhold G. Pflugfelder, both of Scottsdale, Ariz.
[73] Assignee: Motorola, Inc., Franklin Park, Ill.
[22] Filed: Nov. 9, 1970
[21] Appl. No.: 87,908

[52] U.S. Cl..............343/6.8 R, 307/234, 307/273, 328/111, 328/112, 328/207
[51] Int. Cl...........................G01s 9/56, H03k 3/284
[58] Field of Search.........343/6.8 R, 6.8 LC, 17.1 R; 307/234, 273; 328/207, 111, 112

[56] References Cited

UNITED STATES PATENTS 3,383,680 5/1968 Diven..............................343/6.8 LC
3,122,647 2/1964 Huey.....................................307/218
3,531,661 9/1970 Boyden..................................307/273
3,543,054 11/1970 Schrader............................307/273 X
3,553,593 1/1971 Gedance...........................307/234 X
3,379,981 4/1968 Humpherys..........................328/112

*Primary Examiner*—Malcolm F. Hubler
*Attorney*—Mueller, Aichele & Gillman

[57] ABSTRACT

A radar transponder is disclosed which discriminates between the lengths of the pulses received and retransmits a pulse of one length upon receipt of a pulse of a short time duration and retransmits a pulse of a greater length upon receipt of a pulse of a longer time duration. The discriminator sets an output monostable multivibrator to produce the long pulse upon receipt of the long interrogation pulse and the output monostable multivibrator is then triggered by a delayed pulse that is responsive to the received pulse.

5 Claims, 2 Drawing Figures

PATENTED JAN 23 1973                                           3,713,145

INVENTOR.
Thomas A. Butler
BY Reinhold G. Pflugfelder

Mueller & Aichele
ATTY'S.

PULSE WIDTH CONTROL FOR RADAR TRANSPONDERS

BACKGROUND

Radar transponders are known in which the transponder receives a pulse transmitted to it by a radar transmitter and retransmits the pulse to the radar installation. Usually, the return pulse transmitted by such a transponder is of the same length regardless of the length of the interrogation pulse. It is advantageous to provide a transponder which returns a pulse that approximates the received pulse in duration, such as for working simultaneously with radars of different interrogation pulse widths. Range measurement errors due to unequal pulse widths are thereby eliminated.

It is an object of this invention to provide a radar transponder which retransmits a pulse, upon receipt of an interrogation pulse, that approximates the duration of the interrogation pulse.

SUMMARY

According to this invention, the transponder includes a pulse length discriminator and a reply monostable multivibrator (hereinafter monovibrator). The reply monovibrator includes a time constant circuit which determines the length of the pulse produced thereby. The time constant of the reply monovibrator is adjustable between a fixed short length and a fixed long length. If the interrogation pulse is less than a certain time duration, the time constant of the reply monovibrator is not changed and it is triggered after a delay in response to the interrogation pulse to provide its short duration output pulse. If the interrogation pulse is of greater length than the certain time duration, the time constant of the reply monovibrator is changed to its long length and then the monovibrator is triggered by the interrogation pulse after the delay. The delay is great enough so that the monovibrator may be in the time constant state corresponding to the length of the interrogation pulse before it is triggered.

DESCRIPTION

Figure 2:
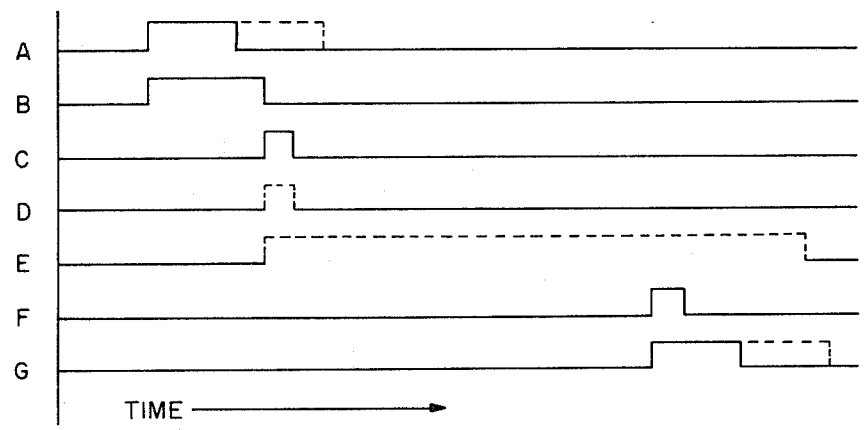

The invention will be better understood upon reading the following description in connection with the accompanying drawing in which:

FIG. 1 is a block diagram showing a circuit including the instant invention; and FIG. 2 is a timing chart which is useful in explaining the operations of the circuit of FIG. 1.

Turning to FIG. 1, after the interrogation or inquiry wave has been picked up by an antenna (not shown) and detected and amplified and squared, it appears on the line 10 as an input pulse A. The pulse A is applied to the monovibrator 12 to which line 10 is connected. The monovibrator 12 is a known article of commerce which produces one pulse of a predetermined pulse duration each time a pulse is applied thereto, the inquiry wave or pulse A and the output pulse B of the monovibrator 12 starting at the same instant. The length of the inquiry pulse A is determined by the radar transmitter (not shown). The length of the output pulse B is determined by the design of the monovibrator 12.

The output of the monovibrator 12 is applied to a monovibrator 14 as by a line 16. The monovibrator 14 is designed to produce a pulse C of relatively short duration compared to the duration of the pulse B and starting at the end of the pulse B. This pulse C is applied to one input terminal of an AND circuit 18 as by a line 20. The inquiry pulse A is applied to the other input terminal of the AND circuit 18 as by a line 22. The AND circuit 18 is also a known article of commerce which produces an output D when and only when the inputs A and C are coincident in time. The D pulse is applied to the input of another monovibrator 24 by way of a line 26. The monovibrator 24 produces an output pulse E which starts with the beginning of the pulse D and continues for a considerable time for a purpose to be explained. The output of the monovibrator 24 is such as to open a switch 28, which is shown in its normally closed position by a solid line. The fact that the monovibrator 24 controls the switch 28 is indicated by the dotted line 30. While a make and break switch 28 has been shown, any known switch may be used such for example as a transistor (not shown) which is normally conductive and which is rendered non-conductive by the output of the monovibrator 24. The output of the monovibrator 24 which is an electrical pulse E is applied to the control electrode of the mentioned transistor type switch. The switch 28 when closed, short-circuits a resistor 32. The resistor 32 is connected in series between a voltage supply terminal 34 and a second resistor 36 and is part of a time constant circuit of an output monovibrator 38. The resistors 32 and 36, being a part of the time constant circuit of the output monovibrator 38, control the duration of the pulse produced thereby. When the switch 28 is closed, the time constant depends on the size of the resistor 36 since the resistor 32 is short-circuited. When the switch 28 is opened by operation of the monovibrator 24, the time constant circuit of the monovibrator 38, which depends on the sum of the resistances 32 and 36, is longer than when the switch 28 is closed. The output monovibrator 38 therefore produces a short output pulse when triggered while the switch 28 is closed and produces a long output pulse when triggered while the switch 28 is opened. A trigger pulse F is applied to the input of the output monovibrator 38, the length of the pulse F being short but the pulse F being responsive to the received inquiry pulse A as delayed and reconstituted by a delay monovibrator 40 to which the inquiry pulse A is applied by way of a line 42.

In explaining the operation of the device of FIG. 1, it is first assumed that the input pulse A is of the length shown in solid lines at line A of FIG. 2. As stated, the output B of the monovibrator 12 is always of the length shown at line B of FIG. 2 and starts with the beginning of the pulse A. The pulse C is always of the length shown in line C of FIG. 2 and starts at the end of the pulse B. By the time the pulse C is produced, the pulse A has ended. There is therefore an input at the C input of the AND circuit 18 but no input at the A input thereof. Therefore there is no output of the AND circuit 18 or of the monovibrator 24 and the normally closed switch 28 is closed as shown in solid lines in FIG. 1. The time constant of the output monovibrator 38 remains short and when the pulse F caused by the inquiry pulse A triggers the monovibrator 38, it provides an output pulse G which is of the length of the solid lines of line G of FIG. 2. This pulse may modulate a transmitter (not shown) whereby a pulse of the length of the solid line portion of pulse G is retransmitted. It will be noted that the solid line portion of the pulse G is of constant length no matter how short the pulse A is, and the solid line portion of the pulse G is not changed in length as long as the pulse A is not longer than the pulse B.

Now let it be assumed that the inquiry pulse A is equal in length to the sum of the solid and dotted portions of the showing of line A of FIG. 2. Then when the pulse C is applied to the input 20 of the AND circuit 18, the pulse A will still be in existence and the A pulse and the C pulse will be applied to the two inputs of the AND circuit coincidentally whereby the D pulse shown in dotted lines in line D of FIG. 2 is applied to the monovibrator 24. An output pulse E of the monovibrator 24 is then produced as shown in line E of FIG. 2, the E pulse starting with the beginning of the D pulse and continuing for a time long enough for the A pulse to go through the delay monovibrator 40 and for the F pulse to be applied to the output monovibrator 38. The existence of the E pulse opens the switch 28, as shown in dotted lines in FIG. 1, and the time constant of the monovibrator 38 is increased as explained above, whereby, upon being triggered by the F pulse, the monovibrator 28 produces an output pulse G which is as long as the sum of the solid and dotted portions of the line G of FIG. 2. Therefore, when the inquiry pulse A is longer than the B pulse, the output pulse G is of a constant length, greater than the length thereof when the inquiry pulse is shorter than the pulse B. As shown, the long pulse G may be twice as long as the short pulse G.

What is claimed is:

1. Means for producing a transponder output pulse whose duration depends on the duration of an interrogating radar pulse comprising:

a triggerable monovibrator including an adjustable time constant means for controlling the duration of the output pulse produced thereby, said monovibrator producing an output pulse of a short duration when said time constant circuit is adjusted in one direction and which produces a long duration output pulse when said time constant circuit is adjusted in the opposite direction;

means to produce a first pulse of a fixed length in response to an interrogating pulse and starting with the beginning of said interrogating pulse;

means to provide a second pulse starting with the end of said first pulse and of a fixed length;

means to provide a third pulse when said interrogating pulse and said second pulse are coincident;

means responsive to said third pulse to change the time constant in a direction to change the length of said output pulse; and means for applying a triggering pulse to said triggerable monovibrator whereby said monovibrator produces a pulse of a duration controlled by the state of adjustment of said time constant circuit when said monovibrator is triggered.

2. The apparatus of claim 1 in which means are provided for producing said triggering pulse in response to said interrogating pulse and at a delayed time thereafter.

3. The apparatus of claim 1 wherein the length of said fixed length pulse is greater than the lengths of an interrogating pulse of one length and the combined lengths of said fixed length pulse and said second pulse is within the length of another interrogating pulse of a greater length.

4. The apparatus of claim 1 wherein said means responsive to said third pulse to change the time constant comprises switch means.

5. The apparatus of claim 4 wherein said switch means are energized to effect an increase in the length of said output pulse.

* * * * *